April 16, 1968     C. K. BRIDGEMAN     3,377,769
VACUUM SEALING UNIT
Filed Feb. 10, 1965     2 Sheets-Sheet 1
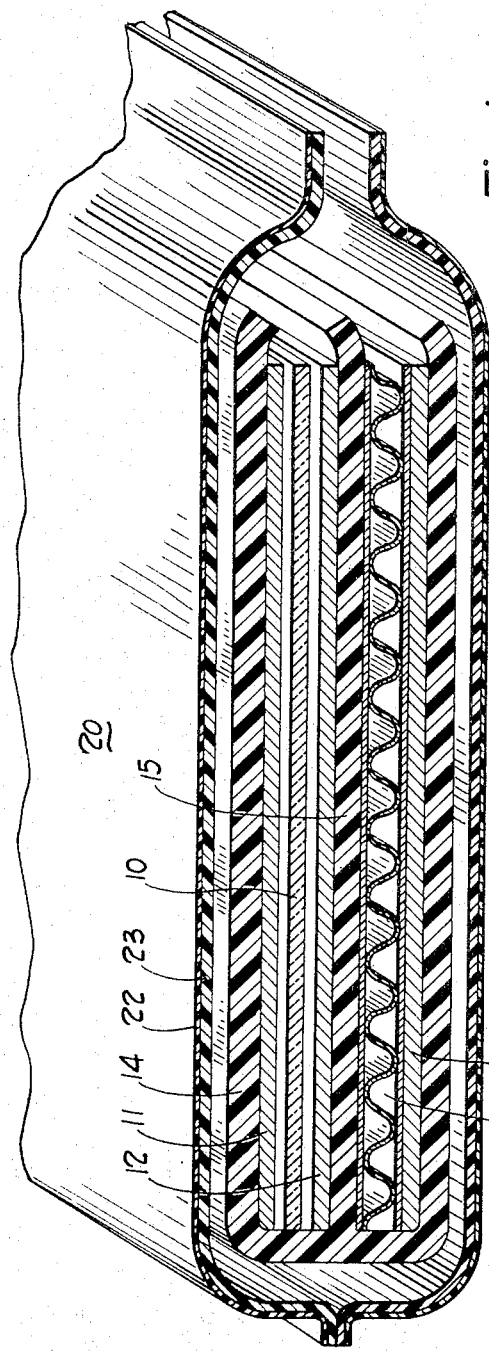
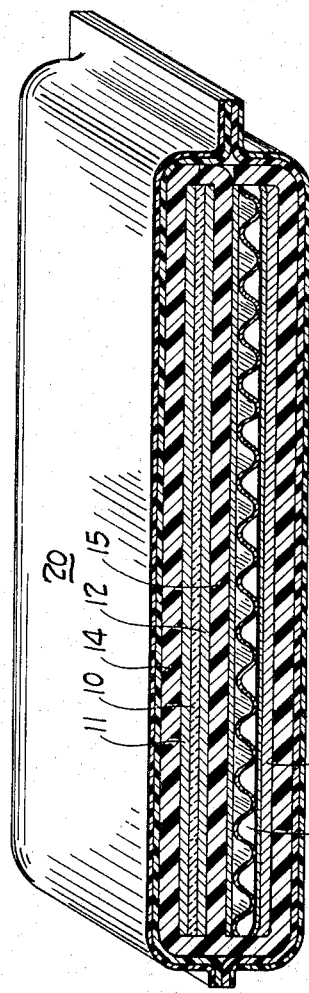
INVENTOR
CECIL K. BRIDGEMAN
BY
*Watts & Fisher*
ATTORNEYS.

April 16, 1968  C. K. BRIDGEMAN  3,377,769
VACUUM SEALING UNIT

Filed Feb. 10, 1965  2 Sheets-Sheet 2

INVENTOR
CECIL K. BRIDGEMAN
BY
Watts & Fisher
ATTORNEYS

United States Patent Office 3,377,769
Patented Apr. 16, 1968

3,377,769
VACUUM SEALING UNIT
Cecil K. Bridgeman, Islington, Ontario, Canada, assignor to Picker X-ray Mfg. Limited, Rexdale, Canada
Filed Feb. 10, 1965, Ser. No. 431,590
6 Claims. (Cl. 53—84)

ABSTRACT OF THE DISCLOSURE

A unit in which a film holder in the form of a flexible bag is evacuated and sealed. The unit has movable jaws that close and heat seal an open portion of the film holder after the pressure in the unit and holder is reduced to a predetermined level.

Disclosure

This invention relates to a vacuum heat sealing unit and more particularly to a unit for evacuating an X-ray film holder and then heat sealing the evacuated holder.

X-ray film is customarily placed within a film holder known as a cassette before being irradiated with X-rays. The purpose of the film cassette is to protect the X-ray film from light and to hold the film in a desired configuration, for example, in a flat plane. In most studies where relatively high energy is used it is common practice to sandwich a sheet of X-ray film between two fluorescent or electron emissive intensifying screens. Such screens fluoresce or emit electrons when irradiated by X-rays and intensify the image produced on the film. Maximum resolution of the image is attained only when the intensifying screens are maintained in close, uniform contact with the film. Thus, one important function of film holders for X-ray film is to maintain the intensifying screens in the desired close, uniform contact with the X-ray film.

An improved film holder of film pack that maintains intensifying screens in close, uniform contact with the X-ray film is disclosed in the copending application of C. K. Bridgeman and F. H. Umberg, Ser. No. 433,251 filed Feb. 10, 1965, now Patent No. 3,348,042, and entitled, Film Pack, which application is assigned to the assignee of the present invention and is incorporated herein by reference. In accordance with that invention, a sheet of X-ray film with an intensifying screen adjacent each surface is located within a flexible, X-ray-transparent, light-opaque, fluid-tight, heat-sealable bag or pouch. The bag is essentially gas free, having been evacuated and heat-sealed. Atmospheric pressure, applied equally over the entire flexible bag, presses the intensifying screens tightly and uniformly against the sheet of X-ray film. The bag is suitably constructed of a tear resistant transparent polyester film outer ply and a light-opaque, thermoplastic, bondable inner ply. Where desired, a stiffening member and an X-ray shield may be included within the bag.

The present invention is directed to methods and apparatus for evacuating and heat-sealing a film holder, such as the film pack disclosed and claimed in the said copending application.

Briefly, the vacuum welding unit of the present invention includes an evacuating chamber in which an open, heat-sealable, flexible film holder is placed. A pair of movable jaws are located within the chamber in opposed relationship to each other. Means within the jaws, such as resistance coils, serve to heat the jaws to a temperature sufficient to heat-seal the open portion of the film holder. The holder is placed within the evacuating chamber with an open portion between the movable welding jaws, and the chamber or vacuum box is closed. In a sequence determined by a control circuit associated with the vacuum welding unit, the evacuating chamber is connected to a vacuum source and evacuated, thereby evacuating the film holder. After the pressure within the chamber has been reduced to a predetermined level, the movable jaws close the open portion of the film holder and the jaws are heated to heat-seal the open portion under elevated temperature and compressive pressure. After the film holder is sealed, the vacuum is released and the film holder removed from the vacuum welding unit. Preferably, the welding jaws are held closed after the heating step has been terminated and while the vacuum is released to assure a fluid-tight seal.

It will be apparent, that this invention provides a convenient and essentially automatic way to evacuate and seal a heat-sealable film pack. The simplicity of this essentially automatic heat-sealing operation readily facilitates the use of the vacuum welding unit and practice of the method of the present invention under conditions of semi-darkness or darkness that are required up to the time the film is sealed within the film pack, to prevent fogging of the film by light.

Other attendant advantages and features of this invention will be readily appreciated as the same become better understood by reference to the following detailed description when considered in connection with the accompanying drawings in which:

FIGURE 1 is a diagrammatic, partial, perspective view, with parts in section, of a film pack adapted to be evacuated and heat-sealed in accordance with the present invention;

FIGURE 2 is a sectional view showing the vacuum film pack of FIGURE 1 after the outer container has been evacuated and heat-sealed in accordance with the present invention;

Figure 3:
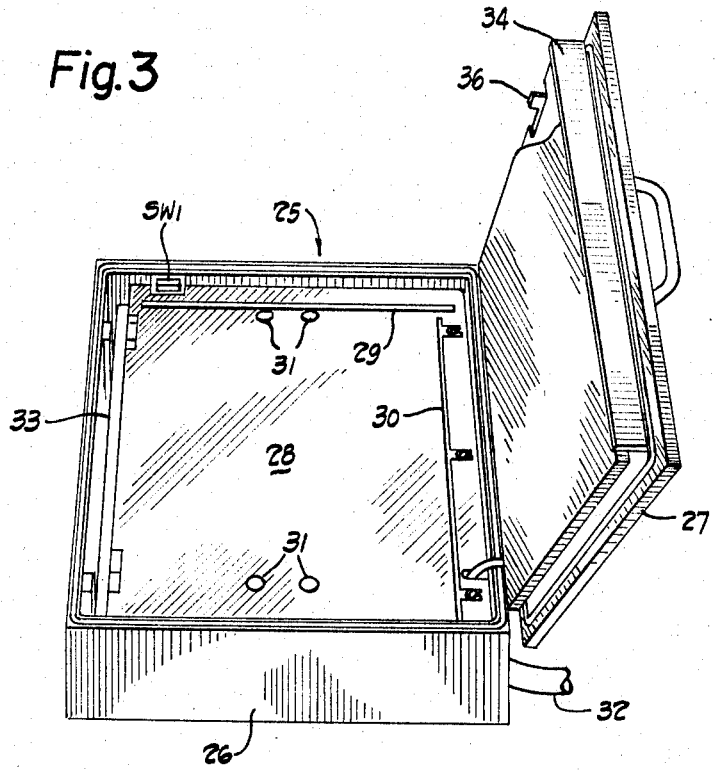
FIGURE 3 is a perspective view of a vacuum welding unit constructed in accordance with the present invention.

Referring now to FIGURES 1 and 2, a sheet of X-ray film 10 is sandwiched between two intensifying screens 11 and 12. These three elements are enfolded or wrapped in an X-ray transparent, protective, covering 14, such as a sheet of polyvinyl chloride. A sheet of polyvinyl chloride of a thickness of approximately 12 mils performs satisfactorily. The X-ray film 10 and the intensifying screens 11 and 12 are substantially identical in shape and area. The protective covering 14 is approximately the same width as the film, but slightly greater than twice as long. The covering is folded in half to cover the outer surfaces of the intensifier screens and extends beyond the screens along the edge opposite the fold to facilitate handling of the subassembly.

A sheet of stiff material, preferably porous or chambered and somewhat compressible, such as a sheet of corrugated cardboard 16, is positioned adjacent one surface of the enwrapped film and intensifier screens. The sheet of cardboard 16 is of the same shape and area as the sheet of X-ray film 10. By way of example, it has been found that a sheet of corrugated cardboard 3/16 inch thick provides the desired rigidity and compressibility, while providing chambers that functions as vacuum reservoirs. One surface of the sheet of corrugated cardboard 16 is covered with a coating, such as a lead sheet 17, that is substantially impervious to X-rays. Such a shield serves to prevent back-scatter of X-rays that have passed through the X-ray film 10. The lead sheet 17 is adhered to the sheet of cardboard 16 by an adhesive. For ordinary use, a sheet of lead 0.005 inch thick is generally satisfactory. However, where the film pack is to be used in a stack where the subsequent film packs to be exposed are placed directly behind the film pack that is being irradiated, a somewhat thicker coating of lead is desirable.

An outer bag or pouch 20 envelops the sheet of cardboard and enwrapped sheet of film and intensifying screens. The bag 20 has one open end 21 through which the contained elements are inserted and from which the air within the bag 20 is subsequently evacuated. The bag 20 is formed of two plys, an outer ply 22 and an inner ply 23. The outer ply 22 is formed of a flexible, fluid-tight, tear-resistant and X-ray-transparent material. The preferred material for the outer ply is a sheet of polyester film. Suitably, the polyester film is a polyethylene glycol ester of terephthalic acid. That is, the polyester film is polymerized polyethylene glycol ester. This material is sold commercially by the Du Pont de Nemours Company under the trademark "Mylar." The inner ply 23 is adhered to the outer ply 22 and forms a light-opaque lining, preferably black, that is flexible, transparent to X-rays, thermoplastic and capable of being heat sealed, i.e., forming a bond. Polyethylene sheet is an inexpensive chemical that is exceptional for this use. An outer ply of Mylar of a thickness between 0.5 to 0.75 mils and an inner ply of polyethylene of a thickness of approximately 3 mils provides a satisfactory outer bag 20.

Processes for fabricating the outer bag 20 are known per se. It will be readily apparent to those skilled in the art that the polyethylene inner ply may be heat adhered to the outer Mylar ply by feeding sheets of the two materials between heated rotary laminating rolls that soften the polyethylene and effect a bond. Bags may thereafter be formed by folding a piece of the two-ply material and heat sealing two of the three open edges.

FIGURE 2 illustrates the outer bag 20 and the contained sheet of film 10, intensifier screens 11 and 12, the protective wrapping 14, stiffening elements 16 and a radiation shield 17, after the outer bag 20 has been evacuated and the opening 21 has been heat sealed in accordance with the present invention. Atmospheric pressure, pressing equally on all surfaces of the flexible bag 20, maintains all of the contained elements within the bag 20 in tight, intimate contact with each adjacent element.

It will be understood that a curved film pack may be evacuated and heat sealed in accordance with the present invention. Thus, a sheet of X-ray film may be sandwiched between two intensifying screens, wrapped in a protective covering, and sealed within an evacuated outer bag. The stiffening element is preferably omitted. Although the outer bag and the elements contained therein are all flexible, the assembled and evacuated film pack will be maintained in curved positions because of the friction of the parts of the film pack which are held in tight contact, each with the next adjacent, by the atmospheric pressure surrounding the pack.

To form the X-ray pack, a sheet of X-ray film 10 is first sandwiched between a pair of intensifying screens 11, 12. The sandwich is wrapped with a protective covering 14 and, along with a stiffening element 16 having a lead coating 17, is inserted through an opening 21 in an outer flexible bag or pouch 20. The bag 20 is then evacuated in the manner to be described below and the open end of the bag 21 is heat sealed. The thermoplastic, bondable, inner ply 23 of the outer bag 20 facilitates such heat sealing.

Where it is desired to form a curved film pack, a subassembly of a sheet of film, two intensifying screens and a protective wrapping is formed, as explained above. This subassembly without a stiffener is inserted within a flexible outer bag, evacuated and sealed. The assembled pack is then curved to the desired contour and held in position, by the friction of the intensifier screens and film.

A vacuum box 25, constructed in accordance with the present invention, for evacuating and heat sealing a heat-sealable film holder or pack is shown in FIGURE 3 of the drawings. The vacuum box 25 includes a base portion 26 and a lid portion 27. When the lid portion is closed, the box is essentially fluid-tight. A support surface 28 is located within the base portion 26 of the box 25 and is adapted to support an assembled film pack. Guide bars 29 and 30 indicate the proper location of the film pack within the box for heat sealing the open portion of the pack. Openings 31 in the support surface 28 communicate to a vacuum source through a conduit 32 and serve to remove air from above the support surface of the vacuum box 25. A welding unit consisting of two welding jaws 33 and 34 is located within the box 25. One welding jaw 33 is located within the base portion 26 adjacent one side of the box and just below the support surface 28. This welding jaw is mounted for vertical movement by a solenoid WS (shown schematically in FIGURE 4. The other welding jaw 34 is located in the lid portion 27 of the vacuum box adjacent the same side of the box as is the lower jaw. The two jaws 33 and 34 are placed in cooperating, opposed, relationship when the lid 27 is closed. Resistor elements WR (shown schematically in FIGURE 4) are located within welding jaws 33 and 34 and serve to heat the jaws. A micro-switch SW1 is located in the base portion 26 of the vacuum box 25, and is in a position to be closed by an actuator 36 fastened to the lid portion 27 of the box, whenever the box lid 27 is closed. The mechanisms for actuating the vacuum and welding unit will be described in connection with the control circuit, which is shown in FIGURE 4 of the drawings.

Figure 4:
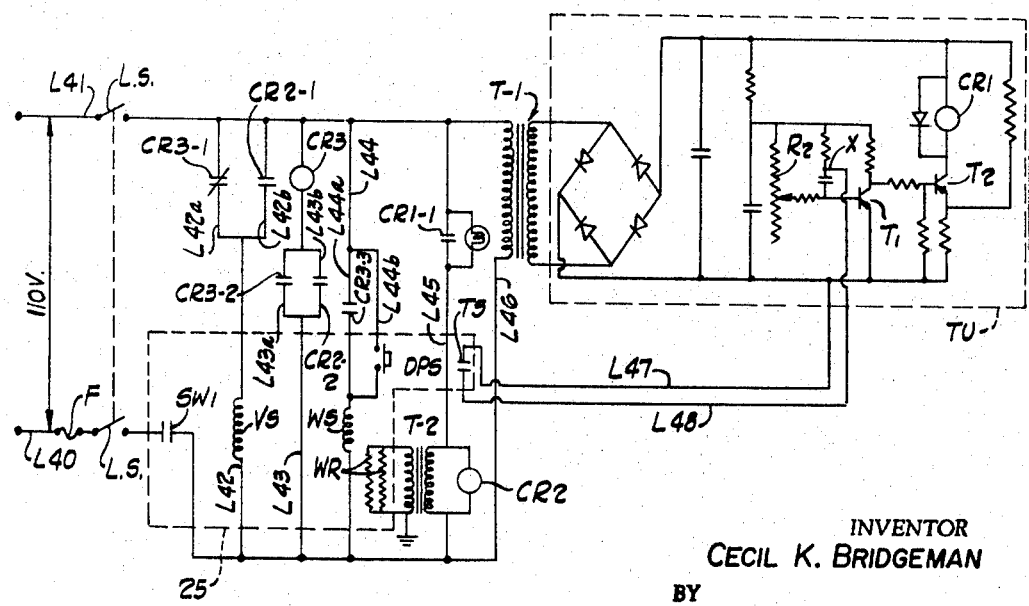
FIGURE 4 is a diagram of the control circuit for the vacuum welding unit of the present invention.

In the circuit diagram of FIGURE 4, the vacuum box 25 is indicated by dotted lines. Components of the circuit within the dotted line, except contact CR1-1, are physically located within the vacuum box 25. The circuit of a commercially available timer unit TU is also outlined by dotted lines and is connected to the operating circuit of the vacuum box through a transformer T1. It will be understood that any timer unit suitable for closing a switch for a predetermined period of time may be used.

The purpose of the vacuum box is to create a vacuum completely surrounding an unsealed X-ray film pack, and to then heat seal or weld the one open end of the pack so that when the vacuum of the box is released, the pack will remain evacuated. The circuit operates on a 110 volt, 60 cycle, single phase electrical supply. This supply is indicated by power lines L40 and L41 in FIGURE 4. A fuse F is located in power line 40 and an on-off line switch LS is in each power line 40 and 41 to prepare the vacuum welding unit for use.

A film holder, such as the pack shown in FIGURE 1, to be evacuated and sealed is placed on the support surface 28 of the vacuum box 25, with the open end 21 of the film pack overlying the lower welding jaw 33. The top portion 27 of the vacuum box 25 is closed. The switch actuator 36 closes the microswitch SW1 in power line L40. A series of circuit lines L42, L43, L44, and L46, and associated sub-circuit lines L42a, L42b, L43b, L44a, and L44b are connected between the two power lines L40 and L41.

The closing of micro-switch SW1 connects a circuit through lines L42, L42a and normally closed contact CR3–1 to actuate a solenoid VS. The solenoid VS controls a solenoid valve (not shown) that connects a vacuum to the vacuum box 25 via the conduit 32.

As the pressure within the vacuum box 25 decreases, a pressure sensitive switch such as a differential pressure switch DPS in line L44b is closed in response to the decrease in pressure. This connects a welding unit solenoid WS through lines L44 and L44b. The welding unit solenoid WS mechanically raises the lower jaw 33, thereby closing the welding unit jaws 33 and 34 to close the opening 21 in the outer bag 20 of the now evacuated film pack.

Movement of the welding unit jaw 33 mechanically closes a timer switch TS in the box 25. The switch is connected by two wires L47 and L48 to the timer unit TU. The timer unit TU includes a main contactor relay coil CR1 that will remain actuated for a predetermined time, as set on the timer unit. Briefly, the closing of the switch TS shorts point X of the timer unit to ground. This raises the base potential of the transistor T1, making it switch off. This in turn, lowers the base potential of the transistor T2 to the point where current flows through the relay coil CR1. The timing period during which the coil CR1 is energized, is adjustable by the resistor R2.

A normally open relay contact switch CR1–1 is shown in circuit line L45. Physically, the contact CR1–1 is located within the timer unit TU and connected with the control circuit of the vacuum box. The energization of coil CR1 closes normally open contact CR1–1 in line L45, energizing a relay coil CR2 and supplying current to the welding unit resistance heating elements WR, through a transformer T2. The welding resistor elements WR are located within the welding jaws 33 and 34 and cause the thermoplastic inner ply 23 of that portion of the bag 20 located between the jaws to become bonded at the bag opening 21.

The energized relay coil CR2 closes a normally open contact CR2–1 in line L43b. This holds the solenoid VS actuated and maintains the vacuum within the vacuum box 25. The coil CR2 also closes a normally open contact CR2–2 in line L43b. This supplies current to the coil of a relay CR3 in circuit line L43.

Energization of the relay coil CR3 opens a normally closed contact CR3–1 in line L42a. It also closes a normally open contact CR3–2 in line L43a, to hold relay coil CR3 energized. Coil CR3 also closes a normally open contact CR3–3 in circuit line L44a to by-pass the differential pressure switch DPS. This maintains the welding jaws 33 and 34 closed to create a forging action upon the heat-sealed opening 21 while the vacuum in the chamber is being released.

At the end of the timing period, as set by the timer unit TU, the relay coil CR1 is de-energized. This opens contact CR1–1 to terminate the welding operation. When contact CR1–1 is opened, relay coil CR2 is de-energized. This opens switch CR2–1 to de-energize the vacuum solenoid VS, reversing the associated valve, and porting the box to atmosphere. Air under atmospheric pressure then enters the vacuum box 25. When the lid portion 27 of the vacuum box is raised, the micro-switch SW1 is opened and the jaw 33 of the welding unit is lowered.

It will be apparent that the method and apparatus for evacuating and sealing the specifically disclosed film pack may be readily utilized with film holders of different construction, as long as they include a heat-sealable opening through which the air within the holder is evacuated. Obviously the film pack may be oriented vertically or in some other desired disposition, and the opening to be sealed may be readily located at one side or at the top, for example. Furthermore, more than one side may be originally open and then sealed. In fact, if desired, the entire outer bag may be essentially formed within the vacuum welding unit by heat sealing all four sides or edges of two separate outer sheets, or by heat sealing three sides of a folded sheet after the box has been evacuated. Thus, while in the foregoing disclosure preferred embodiments of the invention have been disclosed, it will be understood that numerous modifications and alterations may be made therein without departing from the spirit and scope of the invention as set forth in the appended claims.

What is claimed is:

1. In a device for evacuating and heat sealing a film holder having an open, heat-sealable portion:
   (a) a chamber constructed and arranged to be closed and sealed from the atmosphere;
   (b) means for connecting the chamber to a vacuum source;
   (c) a support surface within the chamber, adapted to support a film holder to be evacuated;
   (d) jaws within the chamber at least one of which is movable relative to the other and adapted to close the open portion of the film holder;
   (e) actuating means operatively associated with at least one of the jaws to close the jaws;
   (f) means associated with the jaws to heat the jaws; and
   (g) control means to connect the chamber to the vacuum source, to cause the jaws to close, and to cause heat to be applied to the jaws, each for a predetermined period of time and in a predetermined sequence, said control means including a solenoid that actuates a valve for connecting the chamber to the vacuum source, a pressure sensitive switch that initiates closing of the jaws when the pressure within the chamber is reduced to a predetermined level, a solenoid that mechanically closes the jaws, a timer for controlling the period of time during which heat is applied to the jaws, and a switch actuated by jaw movement to actuate the timer.

2. In a device for evacuating and heat sealing a film holder having an open, heat-sealable portion:
   (a) a chamber constructed and arranged to be closed and sealed from the atmosphere;
   (b) means for connecting the chamber to a vacuum source;
   (c) a support surface within the chamber, adapted to support a film holder to be evacuated;
   (d) jaws within the chamber at least one of which is movable relative to the other and adapted to close the open portion of the film holder;
   (e) actuating means operatively associated with at least one of said jaws to close the jaws;
   (f) means associated with the jaws to heat jaws; and
   (g) control means to connect the chamber to the vacuum source, to cause the jaws to close, and to cause heat to be applied to the jaws, each for a predetermined period of time and in a predetermined sequence, said control means including a solenoid that actuates a valve for connecting the chamber to the vacuum source a pressure sensitive switch that initiates closing of the jaws when the pressure within the chamber is reduced to a predetermined level a solenoid for closing the jaws and a timer for controlling the period of time during which heat is applied to the jaws and for controlling the period of time during which the chamber is connected to the vacuum.

3. The device of claim 2 including a switch actuated by closing movement of the jaws to actuate the timer.

4. In a device for evacuating and heat-sealing a film holder having an open heat-sealable portion:
   (a) a chamber constructed and arranged to be closed and sealed from the atmosphere;
   (b) conduit means extending from the chamber to a vacuum source;
   (c) a support surface within the chamber adapted to support a film holder to be evacuated;
   (d) jaws within the chamber at least one of which is movable relative to the other adapted to close the open portion of the film holder;
   (e) actuating means operatively associated with the jaws to close the jaws;
   (f) means associated with the jaws to heat the jaws; and,
   (g) control means to connect the chamber to a vacuum source, via the conduit, to cause the jaws to close, and to cause heat to be applied to the jaws, each for a predetermined period of time and in predetermined sequence, said control means including:
      (i) a control switch;
      (ii) a solenoid energized through the control switch and adapted upon energization to connect the chamber to a vacuum source;
      (iii) a presusre sensitive switch that initiates closing of the jaws when pressure within the chamber is reduced to a predetermined level;

(iv) a solenoid energized by the pressure sensitive switch that mechanically closes the jaws;

(v) a switch actuated by closing movement of the jaws; and, (vi) a timer, actuated by the switch that is actuated by the closing of the jaws, for initiating the heating of the jaws and to maintain the heating during a predetermined period of time.

5. The device of claim 4 wherein the control means includes means to by-pass the pressure sensitive switch to allow the jaws to be maintained closed after the vacuum source is disconnected and the pressure within the chamber is returned to atmospheric pressure.

6. In a device for evacuating and heat sealing a film holder having an open, heat-sealable portion:

(a) a chamber constructed and arranged to be closed and sealed from the atmosphere;

(b) means for connecting the chamber to a vacuum source;

(c) a support surface within the chamber, adapted to support a film holder to be evacuated;

(d) jaws within the chamber at least one of which is movable relative to the other and adapted to close the open portion of the film holder;

(e) actuating means operatively associated with at least one of the jaws to close the jaws;

(f) means associated with the jaws to heat the jaws; and (g) control means to connect the chamber to the vacuum source, to cause the jaws to close, and to cause to be applied to the jaws, each for a predetermined period of time in a predetermined sequence, said control means including a solenoid that actuates a valve for connecting the chamber to the vacuum source, a pressure sensitive switch that initiates closing of the jaws when the pressure within the chamber is reduced to a predetermined level and means to by-pass the pressure sensitive switch to allow the jaws to be maintained closed after the vacuum source is disconnected and the pressure within the chamber is returned to atmospheric pressure.

References Cited

UNITED STATES PATENTS

| | | | |
|---|---|---|---|
| 2,579,935 | 12/1951 | Kronquest et al. | 53—85 |
| 2,778,177 | 1/1957 | Mahaffy et al. | 53—86 |
| 2,991,609 | 7/1961 | Randall | 53—86 X |
| 3,200,560 | 8/1965 | Randall | 53—86 |
| 3,255,567 | 6/1966 | Kreslar et al. | 53—112 |

TRAVIS S. McGEHEE, *Primary Examiner.*